United States Patent [19]
Ohnuki et al.

[11] Patent Number: 5,646,807
[45] Date of Patent: Jul. 8, 1997

[54] MAGNETIC DISK CARTRIDGE AND SHUTTER OPENING-CLOSING MECHANISM FOR THE SAME

[75] Inventors: Takeshi Ohnuki, Ibaraki-ken; Minoru Fujita, Toride; Osamu Ishizaki; Kazuyoshi Adachi, both of Ibaraki-ken, all of Japan

[73] Assignee: Hitachi Maxell, Inc., Osaka, Japan

[21] Appl. No.: 707,420

[22] Filed: Sep. 4, 1996

[30] Foreign Application Priority Data

Sep. 8, 1995 [JP] Japan ................................ 7-231605

[51] Int. Cl.⁶ ................................................ G11B 23/03
[52] U.S. Cl. ................................................ 360/133; 369/291
[58] Field of Search .......................... 360/133; 369/291

[56] References Cited

U.S. PATENT DOCUMENTS

| | | | |
|---|---|---|---|
| 4,839,766 | 6/1989 | Kato | 360/133 |
| 4,876,619 | 10/1989 | Suzuki | 360/133 X |
| 4,945,530 | 7/1990 | Sandell et al. | 369/291 |
| 5,040,167 | 8/1991 | Tanaka et al. | 369/291 X |
| 5,063,558 | 11/1991 | Takahashi | 360/133 |

FOREIGN PATENT DOCUMENTS 61115284 11/1984 Japan.
3224167 3/1991 Japan.

*Primary Examiner*—John H. Wolff
*Attorney, Agent, or Firm*—Birch, Stewart, Kolasch & Birch, LLP

[57] ABSTRACT

A head shutter is mounted on casing of a magnetic disk cartridge to openably cover a head insertion opening, and a spindle shutter is mounted on the cartridge casing to openably cover a spindle insertion opening. A shutter operating member is mounted on the cartridge casing, and is operable from the outside of the cartridge casing. When the insertion openings are closed, the shutter operating member is engaged with the head shutter and the spindle shutter to hold them against their opening movements, and when the insertion openings are to be opened, the shutter operating member is disengaged from the spindle shutter, and also acts on the head shutter to open the head shutter. A shutter opening-closing mechanism is provided in a disk drive unit, and includes a first shutter opening member for operating the shutter operating member, and a second shutter opening member for moving the head shutter from its half-opened position to its fully-opened position.

5 Claims, 7 Drawing Sheets

MAGNETIC DISK CARTRIDGE AND SHUTTER OPENING-CLOSING MECHANISM FOR THE SAME

BACKGROUND OF THE INVENTION

This invention relates to a magnetic disk cartridge rotatably housing a magnetic disk therein, and also to a mechanism for opening and closing a shutter mounted on the magnetic disk cartridge.

There has heretofore been proposed a magnetic disk cartridge in which a hard disk (that is, a magnetic disk comprising a rigid substrate having a magnetic layer formed on each of the opposite sides or faces thereof) is rotatably housed in a cartridge casing, and the cartridge casing, containing the hard disk therein, is loaded or inserted into a disk drive unit so that information can be recorded in, reproduced from and erased from the hard disk.

FIGS. 6 to 8 show one such conventional magnetic disk cartridge. FIG. 6 is a perspective view of the magnetic disk cartridge as seen from an upper side thereof, FIG. 7 is a perspective view of the magnetic disk cartridge as seen from a lower side thereof, and FIG. 8 is a perspective view of a main portion of a shutter opening-closing mechanism of the magnetic disk cartridge.

As shown in FIGS. 6 and 7, this conventional disk cartridge includes a box-like cartridge casing 3 formed by joining together upper and lower halves 1 and 2 (made of a rigid plastic or the like) of a shallow dish-shape, a head shutter 5 openably covering a head insertion opening 4 formed in a front face of the cartridge casing 3, a hard disk 6 rotatably mounted in a space defined by the cartridge casing 3 and the head shutter 5.

A spindle insertion opening 7 of a circular shape is formed through a substantially-central portion of the lower half 2, and a center hub 8, provided on a central portion of the hard disk 6, is exposed to the exterior through the spindle insertion opening 7. Reference numeral and symbol 8a denotes a center hole formed in a central portion of the center hub 8. The head shutter 5 is made of rigid plastics etc. as used for the upper and lower halves 1 and 2, and is in the form of a rectangular plate having a sufficient size to cover the head insertion opening 4. The head shutter 5 has a pair of coaxial support shafts 9a and 9b mounted respectively at opposite ends thereof, as shown in FIG. 8. An operating projection 10 is formed on and projects forward from the head shutter 5, the operating projection 10 being disposed above the support shaft 9a. The support shafts 9a and 9b are fitted respectively in bearing holes (not shown), formed in the peripheral face of the head insertion opening 4, with the operating projection 10 directed outwardly, thereby making the head shutter 5 pivotal on the front face of the cartridge casing 3.

This magnetic disk cartridge is loaded or inserted into a disk drive unit so that information can be recorded in, reproduced from and erased from the hard disk 6. More specifically, when the magnetic disk cartridge is inserted into the disk drive unit (not shown) through a medium insertion port, formed in the disk drive unit, with the front face or edge of the cartridge casing 3 (on which the head shutter 5 is mounted) directed forward, a shutter opening member 11, provided within the disk drive unit, engages the operating projection 10 (formed on the front surface of the head shutter 5) before the magnetic disk cartridge reaches an insertion completion position, as shown in FIG. 8A. In this condition, when the magnetic disk cartridge is further inserted, the head shutter 5 is pivotally moved about the support shafts 9a and 9b by this inserting force, so that the head insertion opening 4 is opened. Then, when the magnetic disk cartridge is further inserted into the insertion completion position, the head insertion opening 4 is fully opened as shown in FIG. 8B, and head devices (not shown) are inserted through this insertion opening 4, and are disposed respectively on the opposite sides of the hard disk 6.

At the time when the magnetic disk cartridge is inserted into the insertion completion position, a turntable of the disk drive unit, having a spindle and a magnet for magnetic clamping purposes, is inserted into the cartridge casing 3 through the spindle insertion opening 7, and as a result a distal end portion of the spindle is inserted into the center hole 8a, thereby centering the hard disk 6, and also the lower surface of the center hub 8 is magnetically held or clamped on the upper surface of the turntable. As a result, the hard disk 6 can be driven for rotation, and also the information recording operation and other operations can be effected by the head devices.

A flying or floating magnetic head device is used for this type of magnetic disk cartridge. In the floating magnetic head device, a magnetic head is caused to fly or float a very short distance of a few or several tens of nm (nanometer) off the surface of the hard disk 6 by an air pressure, produced by the rotating hard disk 6, so as to effect the recording of information and so on. When a foreign matter such as dust deposits on the surface of the hard disk 6, the magnetic head may crash, so that the magnetic head and the hard disk are liable to be destroyed. Therefore, the magnetic disk cartridge, which effects the recording etc. of information by the use of the floating magnetic head device, is particularly required to have a high dust prevention effect.

However, as described above, in the conventional magnetic disk cartridge, there is not provided any shutter for covering the spindle insertion opening 7, and therefore foreign matters such as dust are liable to intrude into the cartridge casing 3 through a gap between the peripheral edge of the spindle insertion opening 7 and the center hub 8, so that the magnetic head is liable to crash.

Additionally, foreign matter is liable to deposit on the surface of the center hub 8, and therefore when the magnetic disk cartridge is loaded into the disk drive unit, the foreign matter is liable to be sandwiched between the center hub 8 and the turntable, and as a result the hard disk 6, when driven for rotation, shakes or vibrates. This adversely affects the flying or floating stability of the magnetic head and the reliability of the recording and reproducing operations.

If, in addition to the shutter for the head insertion opening 4, another shutter is provided on the spindle insertion opening 7, the above disadvantages will be overcome. However, if such separate shutters are provided respectively for the head insertion opening and the spindle insertion opening, and are opened and closed independently of each other, there are encountered further disadvantages that the shutter opening-closing mechanism becomes complicated, and that the disk drive unit becomes bulky in size, and becomes costly. Therefore, it is desired to develop a type of shutter construction which will not make the shutter opening-closing mechanism complicated.

SUMMARY OF THE INVENTION

With the above problems in view, it is an object of this invention to provide a magnetic disk cartridge which has a high dust prevention effect.

Another object of the invention is to provide a shutter opening-closing mechanism suited for such a magnetic disk cartridge.

According to a first aspect of the present invention, there is provided a magnetic disk cartridge comprising:

- a cartridge casing having a head insertion opening formed in a front face thereof, and having a spindle insertion opening formed in a reverse or rear face thereof;
- a magnetic disk rotatably housed in the cartridge casing;
- a head shutter mounted on the cartridge casing to openably cover the head insertion opening;
- a spindle shutter mounted on the cartridge casing to openably cover the spindle insertion opening; and
- a shutter operating member mounted on the cartridge casing, said shutter operating member being operable from an outside of the cartridge casing;
- wherein when the head insertion opening and the spindle insertion opening are closed by the head shutter and the spindle shutter, respectively, the shutter operating member is engaged with the head shutter and the spindle shutter to hold them against movement, and when the head insertion opening and the spindle insertion opening are to be opened, the shutter operating member is disengaged from the spindle shutter, and also acts to open the head shutter.

According to a second aspect of the invention, there is provided a shutter opening-closing mechanism for a magnetic disk cartridge having a head shutter, a spindle shutter and a pivotal shutter operating member for operating the head shutter and the spindle shutter, said magnetic disk cartridge being adapted to be removably inserted into a disk drive unit so that the disk drive unit can effect recording, reproduction and erasure of information relative to a magnetic disk mounted in the magnetic disk cartridge, the mechanism comprising:

- a shutter opening member mounted in the disk drive unit, and located in a path of insertion of the magnetic disk cartridge in the disk drive unit;
- wherein in accordance with the insertion of the magnetic disk cartridge into the disk drive unit, the shutter opening member is adapted to automatically engage the shutter operating member to pivotally move the shutter operating member so as to disengage the shutter operating member from the spindle shutter, and as to open the head shutter, and in accordance with further insertion of the magnetic disk cartridge, the shutter opening member gradually increases a degree of opening of the spindle shutter, and when the magnetic disk cartridge reaches an insertion completion position, the shutter opening member fully opens the spindle shutter.

According to a third aspect of the invention, there is provided a shutter opening-closing mechanism for a magnetic disk cartridge having a head shutter, a spindle shutter and a pivotal shutter operating member for operating the head shutter and the spindle shutter, said magnetic disk cartridge being adapted to be removably inserted into a disk drive unit so that the disk drive unit can effect recording, reproduction and erasure of information relative to a magnetic disk mounted in the magnetic disk cartridge, the mechanism comprising:

- a first shutter opening member mounted in the disk drive unit, and located in a path of insertion of the magnetic disk cartridge in the disk drive unit; and
- a second shutter opening member mounted in the disk drive unit, and located in the insertion path;
- wherein in accordance of the insertion of the magnetic disk cartridge into the disk drive unit, the first shutter opening member is adapted to automatically engage the shutter operating member to pivotally move the shutter operating member so as to disengage the shutter operating member from the spindle shutter, and as to half open the head shutter, and in accordance with further insertion of the magnetic disk cartridge, the first shutter opening member gradually increases a degree of opening of the spindle shutter, and when the magnetic disk cartridge reaches an insertion completion position, the first shutter opening member fully opens the spindle shutter; and
- wherein when the head shutter is half opened, the second shutter opening member is adapted to engage the head shutter, and in accordance with the further insertion of the magnetic disk cartridge, the second shutter opening member is adapted to gradually increase the degree of opening of the head shutter, and when the magnetic disk cartridge reaches the insertion completion position, the second shutter opening member is adapted to fully open the head shutter.

In the present invention, there are provided the head shutter, openably covering the head insertion opening, and the spindle shutter openably covering the spindle insertion opening, and only when the magnetic disk cartridge is inserted into the disk drive unit, the head insertion opening and the spindle insertion opening are opened. With this construction, foreign matter is prevented from intruding into the magnetic disk cartridge, and the crash of a magnetic head, as well as damage to the hard disk (magnetic disk) resulting therefrom, can be prevented.

The shutter operating member, operable from the outside of the cartridge casing, is provided between the head shutter and the spindle shutter, and when the head insertion opening and the spindle insertion opening are closed, the shutter operating member is engaged with the head shutter and the spindle shutter to hold them against opening movement, and when the head insertion opening and the spindle insertion opening are to be opened, the shutter operating member is disengaged from the spindle shutter, and is also adapted to act on the head shutter to open the head shutter. With this construction, before the magnetic disk cartridge is loaded into the disk drive unit, the two shutters are prevented from being opened even accidentally, and foreign matter such as dust is prevented from intruding into the magnetic disk cartridge. When the magnetic disk cartridge is loaded into the disk drive unit, the two shutters are opened at the same time by the single shutter opening member provided in the disk drive unit, and therefore the shutter opening-closing mechanism can be simplified, and the disk drive unit can be formed into a thin design, and its cost can be minimized or reduced.

Depending on the size of the cartridge casing, there is a case where it is difficult to fully open the head shutter by the shutter operating member provided in the cartridge casing. Such being the case, by providing the second shutter opening member in the disk drive unit, the head shutter can be easily fully opened.

DESCRIPTION OF THE PREFERRED EMBODIMENTS

A preferred embodiment of a magnetic disk cartridge of the present invention will now be described with reference to FIGS. 1 to 3, 4A–B, and 5A–C.

Figure 1:
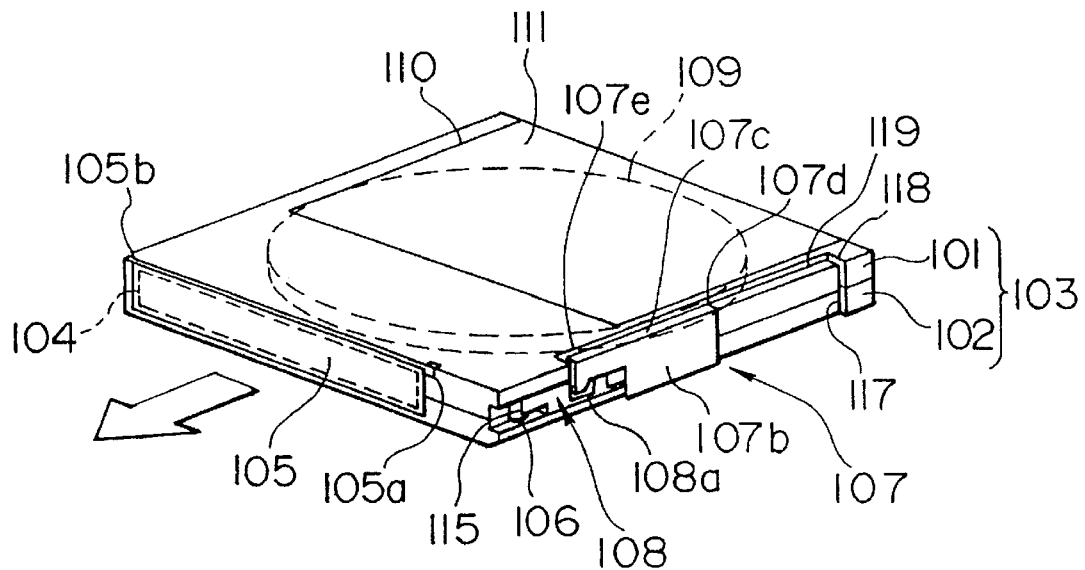
FIG. 1 is a perspective view of a magnetic disk cartridge according to a preferred embodiment of the invention as seen from an upper side thereof.
Figure 2:
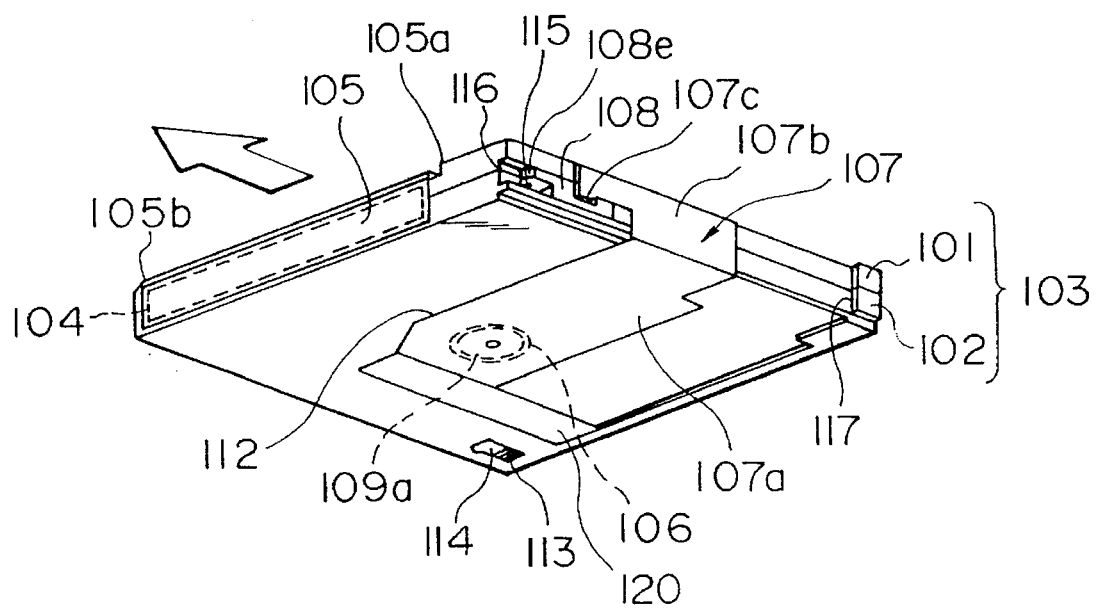
FIG. 2 is a perspective view of the magnetic disk cartridge of FIG. 1 as seen from an lower side thereof.

As shown in FIGS. 1 and 2, the disk cartridge of this embodiment includes or comprises a box-like cartridge casing 103 formed by joining together upper and lower halves 101 and 102 (made of rigid plastics or the like) of a shallow dish-shape, a head shutter 105 openably covering a head insertion opening 104 formed in a front face of the cartridge casing 103, a spindle shutter 107 openably covering a spindle insertion opening 106 formed through a generally central portion of the lower half 102, a shutter operating or operation-control member 108 for engaging and opening the shutters 105 and 107, and a hard disk 109 rotatably mounted in a space defined by the cartridge casing 103, the head shutter 105 and the spindle shutter 107. A center hub 109a is provided on a central portion of the hard disk 109, and is exposed to an exterior of the cartridge casing 103 through the spindle insertion opening 106 formed in the lower half 102.

A label bonding portion 110 in the form of a shallow recess is formed in a generally rear half portion of the upper surface of the upper half 101, and a label 111 is bonded to this label bonding portion 110 if necessary. The spindle insertion opening 106 is formed through the generally central portion of the lower half 102, and a shutter mounting portion 112 in the form of a shallow recess is formed in the lower surface of the lower half 102 at a region including the spindle insertion opening 106. A write protector hole 113 is formed in a region, of the lower half 102, out of the shutter mounting portion 112, and a write protector 114 located therein can be manipulated from an outside of the magnetic disk cartridge.

The head insertion opening 104 is formed in the front face of the cartridge casing 103 formed by joining the upper and lower halves 101 and 102 together, and this head insertion opening 104 is openably covered with the head shutter 105. A through hole 115 is formed in a front portion of one side face of the cartridge casing 103, and a groove 116 of a generally channel-shaped cross-section is also formed in this side face in continuous relation to the through hole 115. The shutter operating member 108 is exposed to the exterior through the through hole 115. Further, a shutter mounting portion 117 in the form of a shallow recess is formed in a rear half portion of this side face of the cartridge casing 103, and is continuous with the shutter mounting portion 112. A shutter mounting portion 118 in the form of a shallow recess is formed in the upper surface of the upper half 101, and is continuous with the shutter mounting portion 117. A shutter guide groove 119 of a channel-shaped cross-section is formed in the upper surface of the upper half 101 adjacent to one lateral side of the shutter mounting portion 118 remote from the one side face of the cartridge casing 103, and extends parallel to this side face.

Figure 4A:
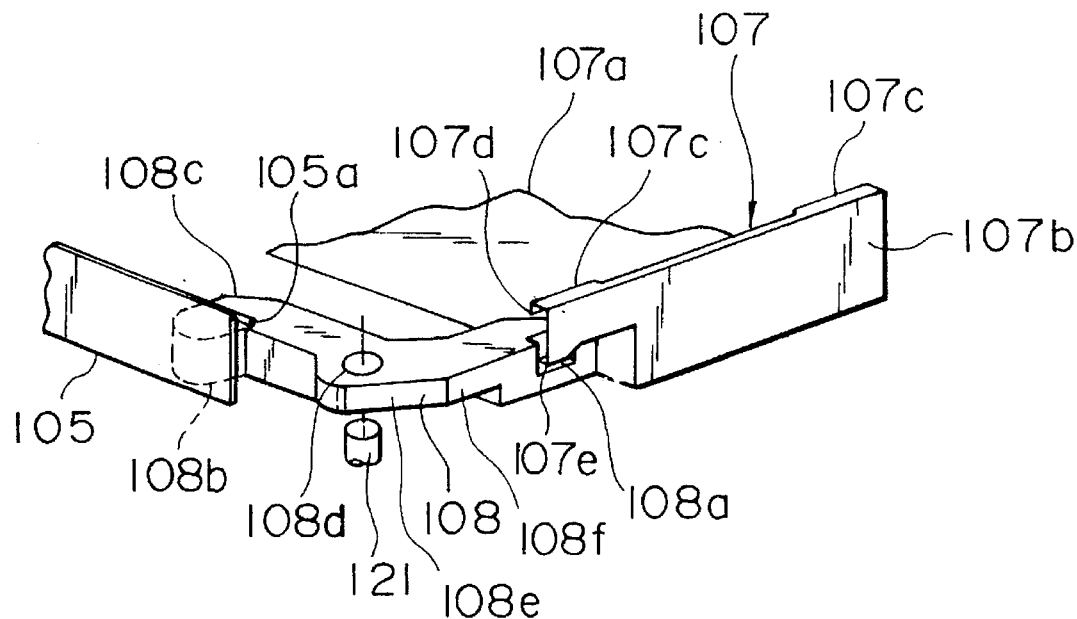
FIGS. 4A and 4B are perspective views of a main portion of the magnetic disk cartridge of FIG. 1, showing the constructions and operations of shutters and a shutter operating member.

As shown in FIGS. 1, 2 and 4A and B, the head shutter 105 made of the same type of rigid plastics as the upper and lower halves 101 and 102 is in the form of a rectangular plate having a sufficient size to cover the head insertion opening 104, and a pair of coaxial support shafts 105a and 105b are mounted respectively on opposite ends thereof. The support shafts 105a and 105b are fitted respectively in bearing holes (not shown), formed in the peripheral edge or face of the head insertion opening 104 so as to be pivotal on the front face of the cartridge casing 103. The head shutter 105 is normally urged or biased in a direction to close the head insertion opening 104 by a return spring (not shown).

As is also clear from FIGS. 1, 2 and 4A and B, the spindle shutter 107 is mounted on the shutter mounting portion 112 formed on the lower half 102. The spindle shutter 107 includes an opening-closing plate portion 107a for opening and closing the spindle insertion hole 106, a side plate portion 107b mounted on the shutter mounting portion 117 formed on the one side face of the cartridge casing 103, a holder portion 107c mounted on the shutter mounting portion 118 formed on the upper surface of the upper half 101, and an engaging portion 107d engaged in the shutter guide groove 119 formed in the upper half 101, and a retaining portion 107e extending from a front end of the side plate portion 107b. This spindle shutter 107 can be formed by bending a sheet of metal (e.g. stainless steel) into the required configuration, or by molding a resin into the required configuration. The plate portions 107a to 107c are mounted respectively on the corresponding or associated shutter mounting portions 112, 117 and 118, and the engaging portion 107d is engaged in the shutter guide groove 119, while a distal end portion of the opening-closing plate portion 107a is inserted in a gap between the lower half 102 and a shutter holder 120 mounted on the lower half 102, thereby enabling the spindle shutter 107 to be mounted slidably on the cartridge casing 103 against disengagement therefrom. The spindle shutter 107 is normally urged or biased to close the spindle insertion opening 106 by a return spring (not shown) extending between the cartridge casing 103 and the spindle shutter 107.

Figure 3:
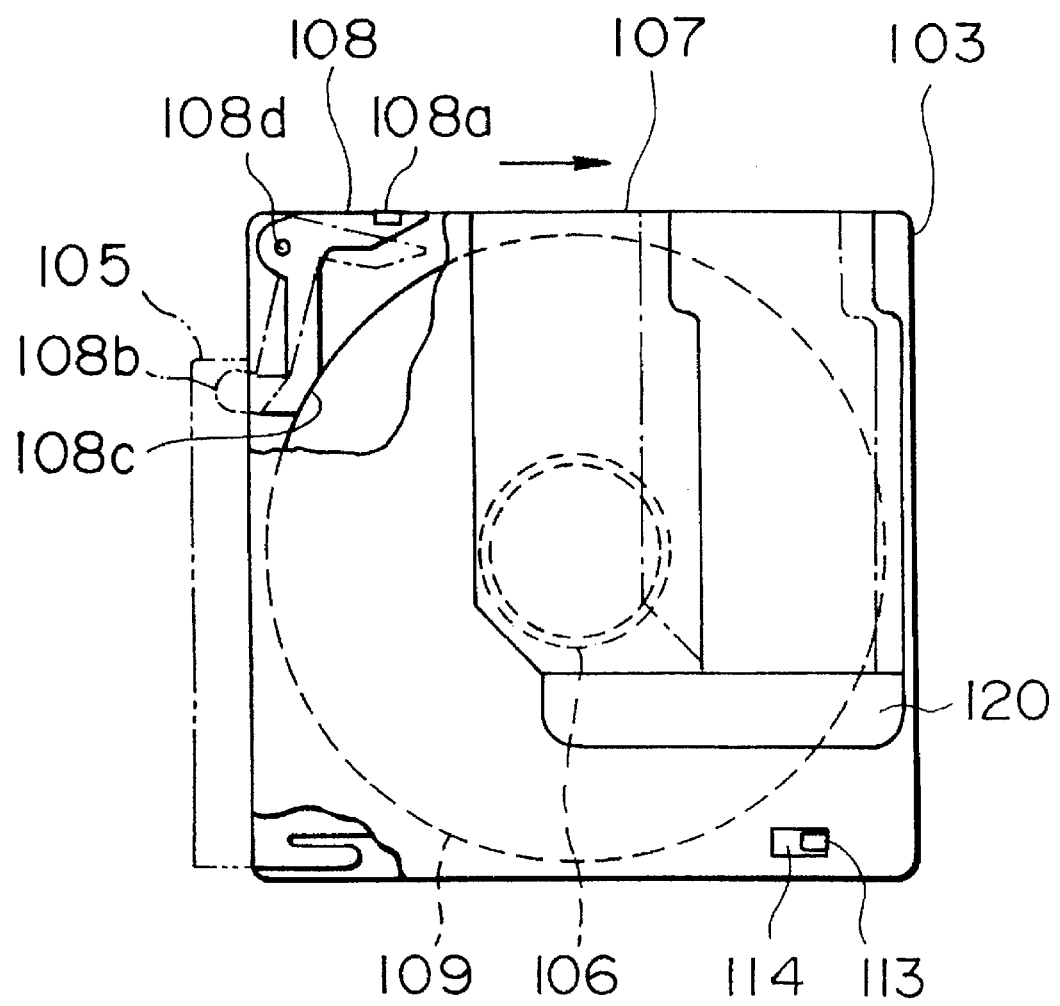
FIG. 3 is a partly-broken view showing the reverse (or lower or rear) side of the magnetic disk cartridge of FIG. 1.
Figure 4B:
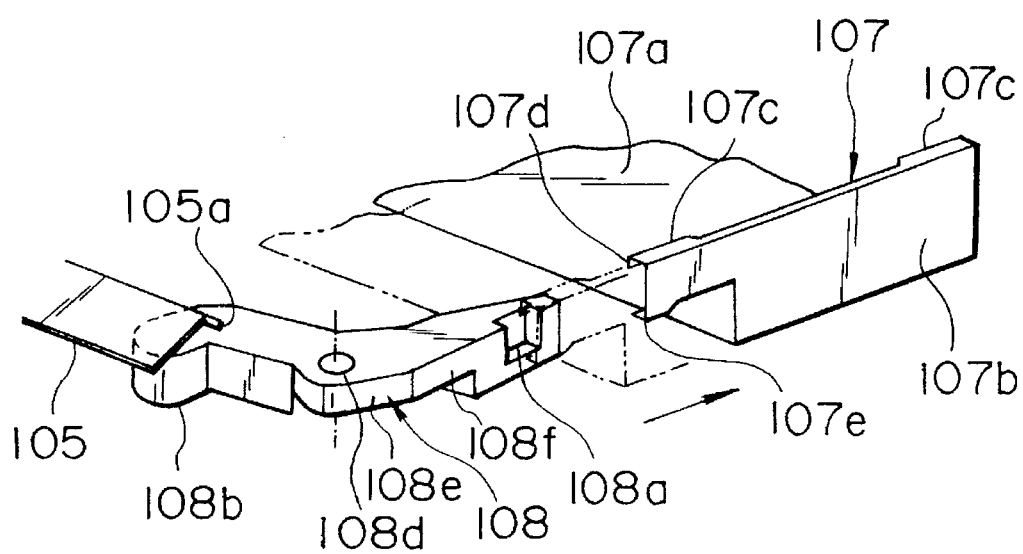

As shown in FIGS. 3 and 4A–B, the shutter operating member 108 has a generally V-shape (more specifically N-shape) in its plan view, i.e. two (more specifically three) arm or leg portions. A retaining portion 108a for the spindle shutter 107 is formed at one end of the shutter operating member 108, and a push portion 108b for the head shutter 105 and a holder portion 108c for the hard disk 109 are formed at the other end thereof. A pivot hole 108d through which the shutter operating member 108 is pivotally mounted in the cartridge casing 103 is formed through a central portion thereof. As shown in FIG. 4A, a mounting shaft 121, formed on and projecting from the inner surface of at least one of the upper and lower halves 101 and 102, is passed through the pivot hole 108d, so that the shutter operating member 108 is pivotally mounted in the cartridge casing 103, while the retaining portion 108a is projected to the exterior through the through hole 115, and is disposed in the channel-shaped groove 116. The shutter operating member 108 can be made of a synthetic resin or the like exhibiting high lubricating properties relative to the upper and lower halves 101 and 102.

The shutter opening-closing mechanism of the magnetic disk cartridge thus constructed, as well as the shutter opening-closing operation, will now be described.

Figure 5A:
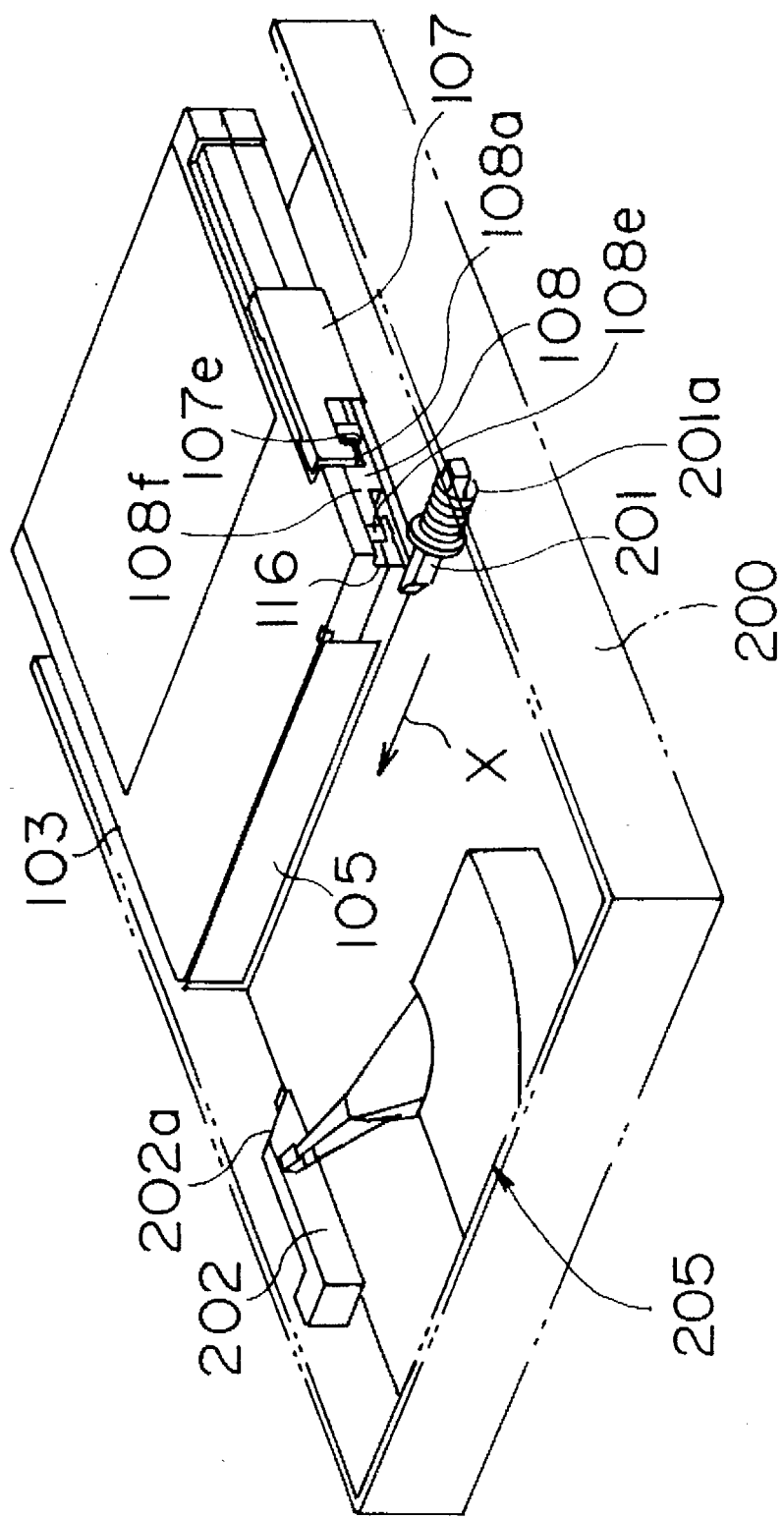
FIGS. 5A to 5C are perspective views of a main portion of the magnetic disk cartridge of FIG. 1, showing a shutter opening-closing mechanism and a shutter opening operation.
Figure 5B:
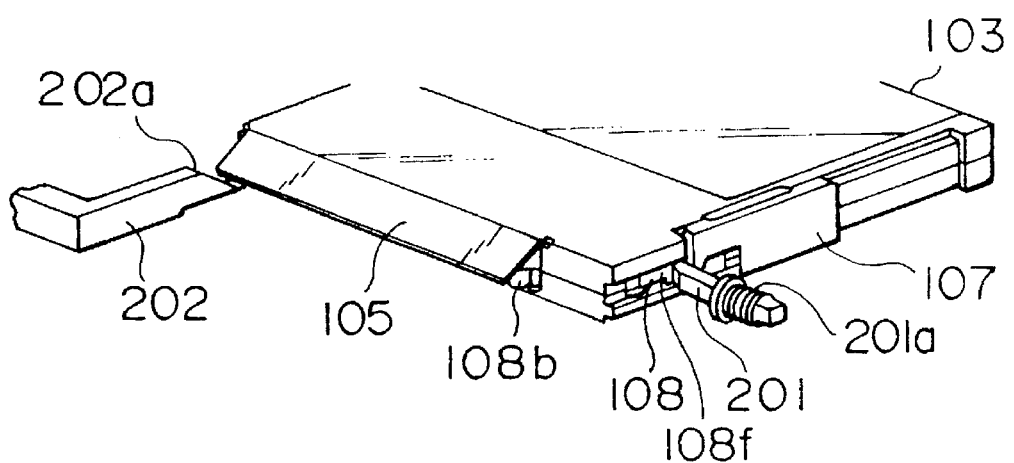
Figure 5C:
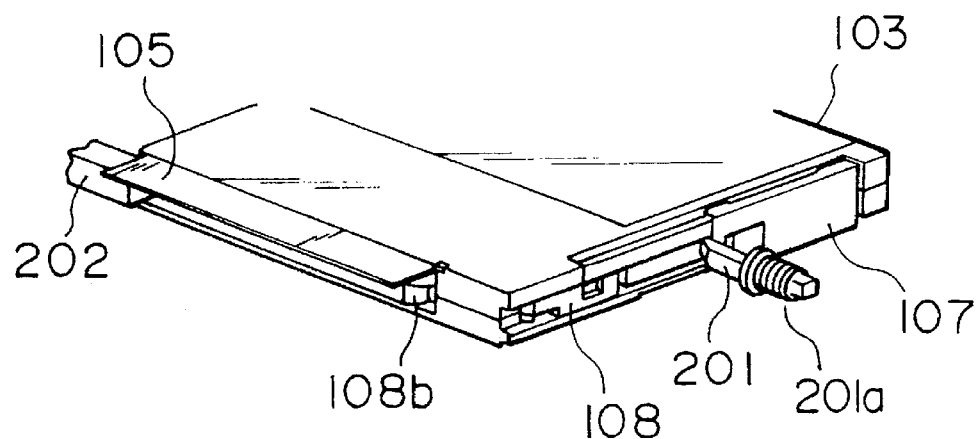
Figure 6:
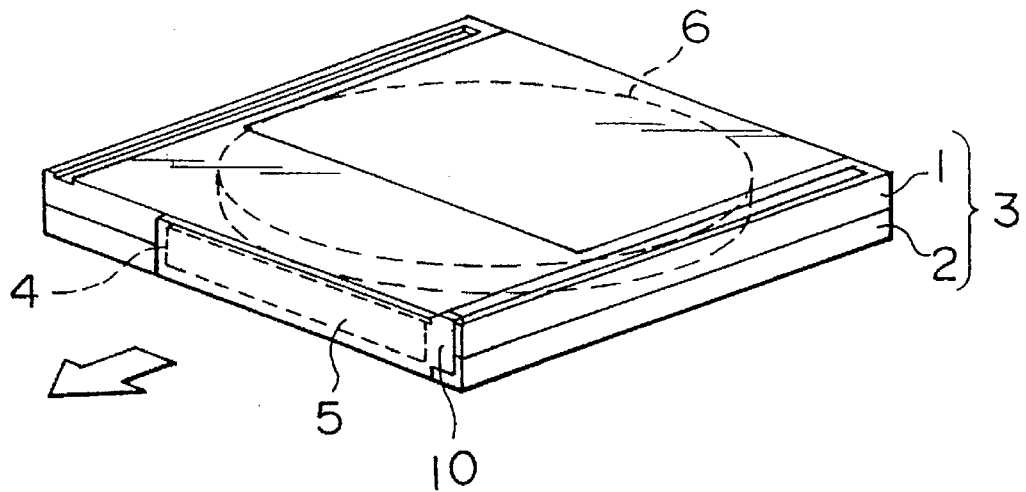
FIG. 6 is a perspective view of a conventional magnetic disk cartridge as seen from an upper side thereof.
Figure 7:
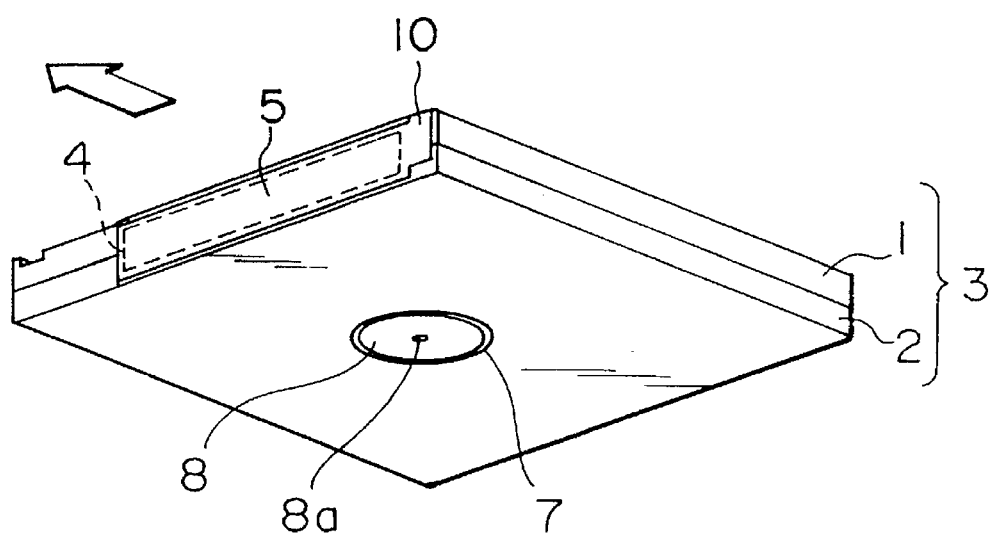
FIG. 7 is a perspective view of the conventional magnetic disk cartridge as seen from a lower side thereof.
Figure 8A:
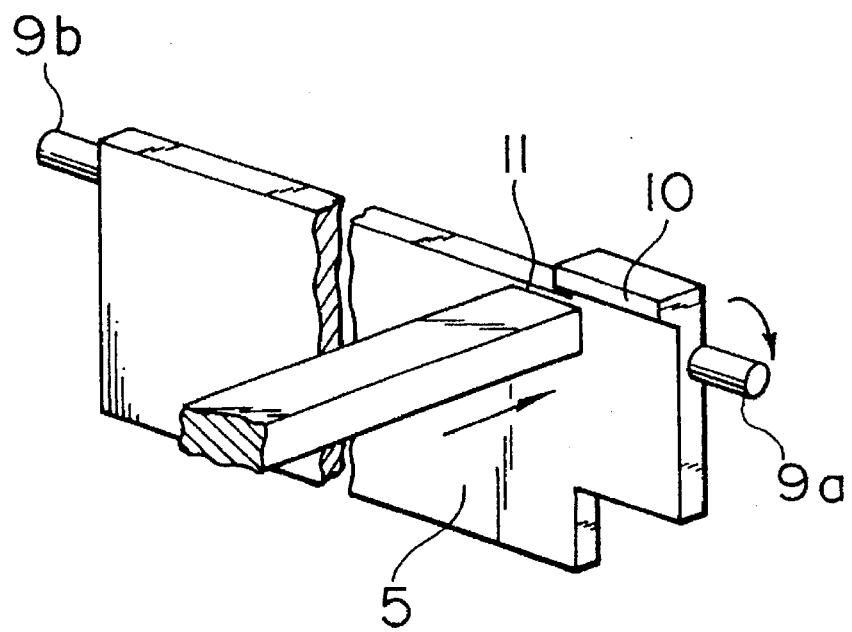
FIGS. 8A and 8B are perspective views showing a shutter opening mechanism of the conventional magnetic disk cartridge.
Figure 8B:
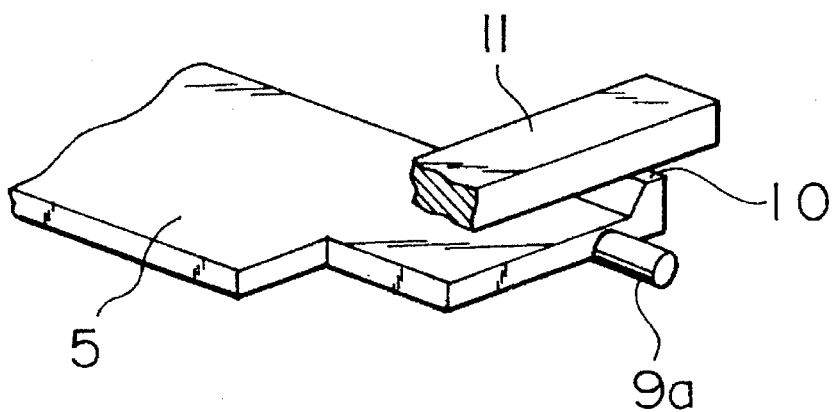

Before the magnetic disk cartridge is loaded into a disk drive unit, the retaining portion 108a of the shutter operating member 108 is disposed parallel to the side face of the cartridge casing 103 as indicated in a solid line in FIG. 3, and also the retaining portion 107e, formed on the spindle shutter 107, is engaged with the retaining portion 108a to retain the retaining portion 108a as shown in FIG. 4A and 5B, thereby preventing the spindle shutter 107 from being accidentally opened. The push portion 108b of the shutter operating member 108 is held in contact with the rear or reverse surface of the head shutter 105 closing the head insertion opening 104, thereby preventing the head shutter 105 from being accidentally opened. Further, the holder portion 108c of the shutter operating member 108 is held in contact with the peripheral edge or face of the hard disk 109 as indicated in a solid line in FIG. 3, thereby preventing the hard disk 109 from accidental shaking.

As shown in FIG. 5A, a first shutter opening member 201 for turning or pivotally moving the shutter operating member 108 and for opening and closing the spindle shutter 107 is provided within the disk drive unit, and a second shutter opening member 202 for fully opening the head shutter 105, having been half opened by the shutter operating member 108, is also provided within the disk drive unit.

The first shutter opening member 201 is disposed on one side of a path of insertion of the magnetic disk cartridge (hereinafter referred to as "disk insertion path"), and is located more specifically at such a position that when the magnetic disk cartridge is inserted into an intermediate position of the disk insertion path, a distal end of the first shutter opening member 201 abuts against the shutter operating member 108. A spring 201a is mounted on the first shutter opening member 201, and urges the distal end thereof toward the disk insertion path as indicated by arrow X, so as to ensure the distal end of the first shutter opening member 201 to be engaged with the bottom of the channel-shaped groove 116 or the side face of the cartridge casing 103. On the other hand, the second shutter opening member 202 is provided at a forward side of the disk insertion path, and a slanting surface 202a is formed on an upper surface thereof at a distal end thereof.

In FIG. 5A, reference numeral 200 denotes a case (shown by imaginary lines) of the disk drive unit, and reference numeral 205 denotes a magnetic head assembly of the disk drive unit.

When the magnetic disk cartridge thus described is inserted, into the disk drive unit having the first and second shutter opening members 201 and 202 mounted therein, with the front face or edge thereof (having the head shutter 105 mounted thereon) directed forward, the distal end of the first shutter opening member 201 is first inserted into the channel-shaped groove 116 formed in the side face of the cartridge casing 103, as shown in FIG. 5B.

When the magnetic disk cartridge is further inserted into a deeper position in the disk insertion path, the shutter operating member 108 is pushed, at an inclined outer face 108e thereof and then at a continuously extending outer face 108f thereof, by the first shutter opening member 201, and is turned or pivotally moved about the mounting shaft 121 as indicated by phantom lines in FIG. 3. As a result, as shown in FIG. 4B, the engagement between the shutter operating member 108 and the spindle shutter 107, as well as the engagement between the shutter operating member 108 and the hard disk 109, are released, and also the head shutter 105 is pushed by the push portion 108b of the shutter operating member 108, and is half opened, as shown in FIGS. 4B and 5B. At this time, the distal end of the slanting surface 202a, formed on the second shutter opening member 202, intrudes beneath the head shutter 105, as shown in FIG. 5B.

When the magnetic disk cartridge is further inserted into a deeper position in the disk insertion path, the distal end of the first shutter opening member 201 is brought into contact engagement with the side plate portion 107b of the spindle shutter 107, and the spindle shutter 107 begins to be opened in response to the magnetic disk cartridge-inserting force. Meanwhile, the lower edge or side of the head shutter 105 slides upwardly over the slanting surface 202a formed on the second shutter opening member 202, thereby increasing the degree of opening of the head shutter 105. Then, at the time when the magnetic disk cartridge is inserted into an insertion completion position in the disk insertion path, the head shutter 105 and the spindle shutter 107 are both fully opened.

At this stage, a magnetic head is inserted through the head insertion opening 104, and also a spindle and a turntable are inserted through the spindle insertion opening 107. In addition, the turntable is clamped on the center hub 109a of the hard disk 109, so that information can be recorded in and reproduced from the hard disk 109.

When an eject button (not shown) is operated after the recording/reproduction operation is finished, the magnetic disk cartridge is discharged back to a disk insertion port of the drive unit along the disk insertion path after the chucking or clamping between the hard disk 109 and the turntable is released.

At an initial stage of the discharging operation, the pressing force of the first shutter opening member 201 is released, i.e., ceases to act on the spindle shutter 107, so that the spindle shutter 107 is returned to the fully-closed position (where this shutter 107 fully closes the spindle insertion opening 106) under the influence of the associated return spring (not shown). Also, the engagement between the head shutter 105 and the second shutter opening member 202 is released, so that the head shutter 105 is returned to the half-opened position (where this shutter 105 half closes the head insertion opening 104) under the action of the associated return spring (not shown).

Then, the first shutter opening member 201 is engaged with the shutter operating member 108 while allowing the shutter operating member 108 to be is turned or pivotally moved in a direction reverse to the direction of pivotal movement thereof during the insertion of the magnetic disk cartridge. As a result, the retaining portion 108a of the shutter operating member 108 is engaged with the retaining or stop portion 107e of the spindle shutter 107, thereby holding the spindle shutter 107 against opening. Meanwhile, the head shutter 105 is returned to the fully-closed position (where this shutter 105 fully closes the head insertion opening 104) under the action of the associated return spring (not shown).

In the above embodiment, the first shutter opening member 201 and the second shutter opening member 202 are provided within the disk drive unit. However, in a case where the head shutter 105 can be substantially fully opened by the shutter operating member 108 to allow the insertion of head, the second shutter opening member 202 can be omitted.

The present invention is not limited to the above embodiment, and the shape, construction or structure and material of each of the members or elements constituting the magnetic disk cartridge can be modified or changed appropriately if necessary or desired. For example, in the above embodiment, the support shafts 105a and 105b, formed respectively at the opposite ends of the head shutter 105, are rotatably fitted respectively in the bearing holes formed in the cartridge casing 103. However, in contrast with this arrangement, support shafts for pivotally supporting the head shutter 105 may be formed on the cartridge casing 103. In the above embodiment, the retaining or engagement portion 107e of a convex shape is provided on the spindle shutter 107 while the retaining or engagement portion 108a of a concave shape is provided at the shutter operating member 108. However, in contrast with this arrangement, a retaining or engagement portion of a convex shape may be provided on the shutter operating member 108 while a retaining or engagement portion of a concave shape may be at the spindle shutter 107. Further, in the above embodiment, the hard disk holder portion 108c is provided on the shutter operating member 108. However, if a separate hard disk holder portion is provided in the cartridge casing 103, the hard disk holder portion 108c of the shutter operating member 108 can be omitted.

What is claimed is:

1. A magnetic disk cartridge comprising:

a cartridge casing having a head insertion opening formed in a front face thereof, and having a spindle insertion opening formed in a reverse or rear face thereof;

a magnetic disk rotatably housed in the cartridge casing;

a head shutter mounted on the cartridge casing to openably cover the head insertion opening;

a spindle shutter mounted on the cartridge casing to openably cover the spindle insertion opening; and a shutter operating member mounted on the cartridge casing, said shutter operating member being operable from an outside of the cartridge casing;

wherein when the head insertion opening and the spindle insertion opening are closed by the head shutter and the spindle shutter, respectively, the shutter operating member is engaged with the head shutter and the spindle shutter to hold them against movement, and when the head insertion opening and the spindle insertion opening are to be opened, the shutter operating member is disengaged from the spindle shutter, and is adapted to act on the head shutter to open the head shutter.

2. A magnetic disk cartridge according to claim 1, in which said head shutter comprises a plate-like member pivotally mounted on one edge of said head insertion hole, and said spindle shutter comprises a plate-like structural member slidably mounted on said cartridge casing to openably cover said spindle insertion opening, and said shutter operating member has a generally V-shape, and includes a retaining portion formed at one end thereof for retaining said spindle shutter, a push portion formed at another end thereof for pushing said head shutter, and a pivot portion formed at a central portion thereof through which said shutter operating member is pivotally mounted in said cartridge casing.

3. A magnetic disk cartridge according to claim 1, in which when said head insertion opening and said spindle insertion opening are closed, said shutter operating member is adapted to engage said magnetic disk to prevent the same from accidentally shaking.

4. A shutter opening-closing mechanism for a magnetic disk cartridge having a head shutter, a spindle shutter and a pivotal shutter operating member for operating the head shutter and the spindle shutter, said magnetic disk cartridge being adapted to be removably inserted into a disk drive unit so that the disk drive unit can effect recording, reproduction and erasure of information relative to a magnetic disk mounted in the magnetic disk cartridge, the mechanism comprising:

a shutter opening member mounted in the disk drive unit, and located in a path of insertion of the magnetic disk cartridge in the disk drive unit;

wherein in accordance with the insertion of the magnetic disk cartridge into the disk drive unit, the shutter opening member is adapted to automatically engage the shutter operating member to pivotally move the shutter operating member so as to disengage the shutter operating member from the spindle shutter, and as to open the head shutter, and in accordance with further insertion of the magnetic disk cartridge, the shutter opening member gradually increases a degree of opening of the spindle shutter, and when the magnetic disk cartridge reaches an insertion completion position, the shutter opening member fully opens the spindle shutter.

5. A shutter opening-closing mechanism for a magnetic disk cartridge having a head shutter, a spindle shutter and a pivotal shutter operating member for operating the head shutter and the spindle shutter, said magnetic disk cartridge being adapted to be removably inserted into a disk drive unit so that the disk drive unit can effect recording, reproduction and erasure of information relative to a magnetic disk mounted in the magnetic disk cartridge, the mechanism comprising:

a first shutter opening member mounted in the disk drive unit, and located in a path of insertion of the magnetic disk cartridge in the disk drive unit; and a second shutter opening member mounted in the disk drive unit, and located in the insertion path;

wherein in accordance of the insertion of the magnetic disk cartridge into the disk drive unit, the first shutter opening member is adapted to automatically engage the shutter operating member to pivotally move the shutter operating member so as to disengage the shutter operating member from the spindle shutter, and as to half open the head shutter, and in accordance with further insertion of the magnetic disk cartridge, the first shutter opening member gradually increases a degree of opening of the spindle shutter, and when the magnetic disk cartridge reaches an insertion completion position, the first shutter opening member fully opens the spindle shutter; and wherein when the head shutter is half opened, the second shutter opening member is adapted to engage the head shutter, and in accordance with the further insertion of the magnetic disk cartridge, the second shutter opening member is adapted to gradually increase the degree of opening of the head shutter, and when the magnetic disk cartridge reaches the insertion completion position, the second shutter opening member is adapted to fully open the head shutter.

* * * * *

UNITED STATES PATENT AND TRADEMARK OFFICE
CERTIFICATE OF CORRECTION

PATENT NO.    :   5,646,807
DATED         :   July 8, 1997
INVENTOR(S)   :   Takeshi OHNUKI et al.

It is certified that error appears in the above-identified patent and that said Letters Patent is hereby corrected as shown below:

On the Title Page, section [73] Assignee: should be changed to read as follows:

[73] Assignee: Hitachi Maxell, Ltd., Osaka Japan

Signed and Sealed this

Fourth Day of May, 1999

Attest:

Q. TODD DICKINSON

Attesting Officer

Acting Commissioner of Patents and Trademarks